July 7, 1953 J. L. PETTUS 2,644,856

MULTIPLE HEAD MOUNTING STRUCTURE

Filed June 7, 1951 2 Sheets-Sheet 1

INVENTOR.
JAMES L. PETTUS
BY Val R. Goshaw
ATTORNEY

July 7, 1953 J. L. PETTUS 2,644,856

MULTIPLE HEAD MOUNTING STRUCTURE

Filed June 7, 1951 2 Sheets-Sheet 2

INVENTOR.
JAMES L. PETTUS
BY Orl R. Graham
ATTORNEY

Patented July 7, 1953

2,644,856

UNITED STATES PATENT OFFICE 2,644,856

MULTIPLE HEAD MOUNTING STRUCTURE

James L. Pettus, Encino, Calif., assignor to Radio Corporation of America, a corporation of Delaware Application June 7, 1951, Serial No. 230,403

8 Claims. (Cl. 179—100.2)

This invention relates to a magnetic head mounting construction, and particularly to a mounting for a plurality of magnetic heads for multiple track recording and reproducing, wherein each individual head may be independently adjusted and all heads adjusted simultaneously.

Magnetic sound recording and reproduction with magnetic heads are well-known, the heads having cores with non-magnetic gaps therein over which a magnetic record medium passes. In such magnetic recording and reproducing systems, it is desirable that the mounting for the heads be provided with adjustments for azimuth, bearing, and alignment of the gaps of the heads with respect to the direction of movement of the magnetic medium. When a single head is used, the adjustments for the gap may be easily built into the mounting for the head. However, in multiple track recording systems, wherein a plurality of heads are positioned transversely of the record medium for the simultaneous or serial recording of a number of parallel sound records, the mounting structure must also have embodied therein features to permit the independent adjustment of each head and the simultaneous adjustment of all the heads. Furthermore, it is necessary that each gap be aligned with the other gaps and adjustments for so aligning must be provided.

The present invention is directed to a mounting construction for such a plurality of magnetic recording, erasing, or reproducing heads whereby such adjustments may be easily accomplished and which will remain fixed after adjustment. The mounting is in a form which may be preadjusted with or without the aid of a microscope prior to attachment to the recorder or reproducer, and also, in a form whereby the adjustments may be made after attachment to the recorder or reproducer. Each adjustment can be positively made, after which the adjusted element can be fixedly locked in position.

The principal object of the invention, therefore, is to facilitate the mounting and adjustment of a plurality of magnetic recording and reproducing heads.

Another object of the invention is to provide an improved magnetic head mounting construction whereby adjustments for azimuth and alignment may be made independently and the adjustment of all heads may be made simultaneously.

A further object of the invention is to provide a simple mounting structure for positioning the gaps of a plurality of heads in alignment transversely of a record medium.

A still further object of the invention is to provide a simple mounting structure which provides independent azimuth and alignment adjustments of the gaps of several magnetic heads and a simultaneous contact adjustment for said heads.

Although the novel features which are believed to be characteristic of this invention will be pointed out with particularity in the appended claims, the manner of its organization and the mode of its operation will be better understood by referring to the following description, read in conjunction with the accompanying drawings, forming a part hereof, in which:

Figure 1:
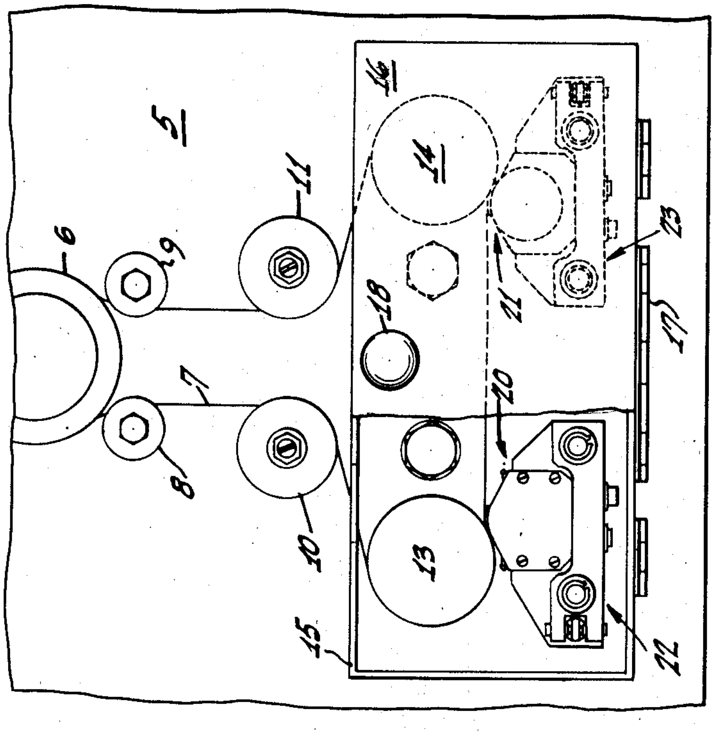
Fig. 1 is a front elevational view showing a plurality of magnetic heads positioned with their mounting structures in a recording and/or reproducing machine.
Figure 2:
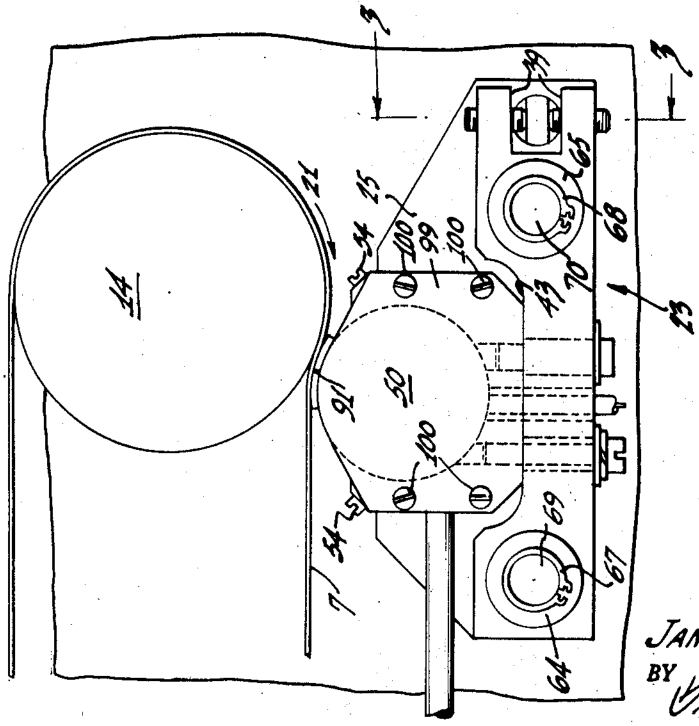
Fig. 2 is an enlarged view of one of the plurality of heads shown in Fig. 1.

Referring now to the drawings, in which the same numerals identify like elements, and referring particularly to Figs. 1 and 2, a panel 5 has mounted thereon a magnetic film or tape advancing sprocket or capstan 6 which advances magnetic film or tape 7 in either direction. Guide rollers 8 and 9 are adjacent the sprocket or capstan 6, while guide rollers 10 and 11 guide the film to and from speed stabilizing drums 13 and 14, on the shafts of which may be flywheels. The drums 13 and 14 are enclosed within a housing shield 15 having a door 16 hinged at 17. A knob 18 is used for opening and closing the door 16.

Also positioned within the housing 15 is a unit 20 of three aligned heads and a unit 21 of three aligned heads positioned in the mounting structures 22 and 23, respectively. The heads of the type disclosed and claimed in Rettinger co-pending application, Ser. No. 151,567, filed March 24, 1950, are suitable for use in this invention. The details of the mounting structures which accurately position the gaps of the heads at the proper positions with respect to the film 7 and with each other will now be described.

Figures 3, 4, 5, 6:
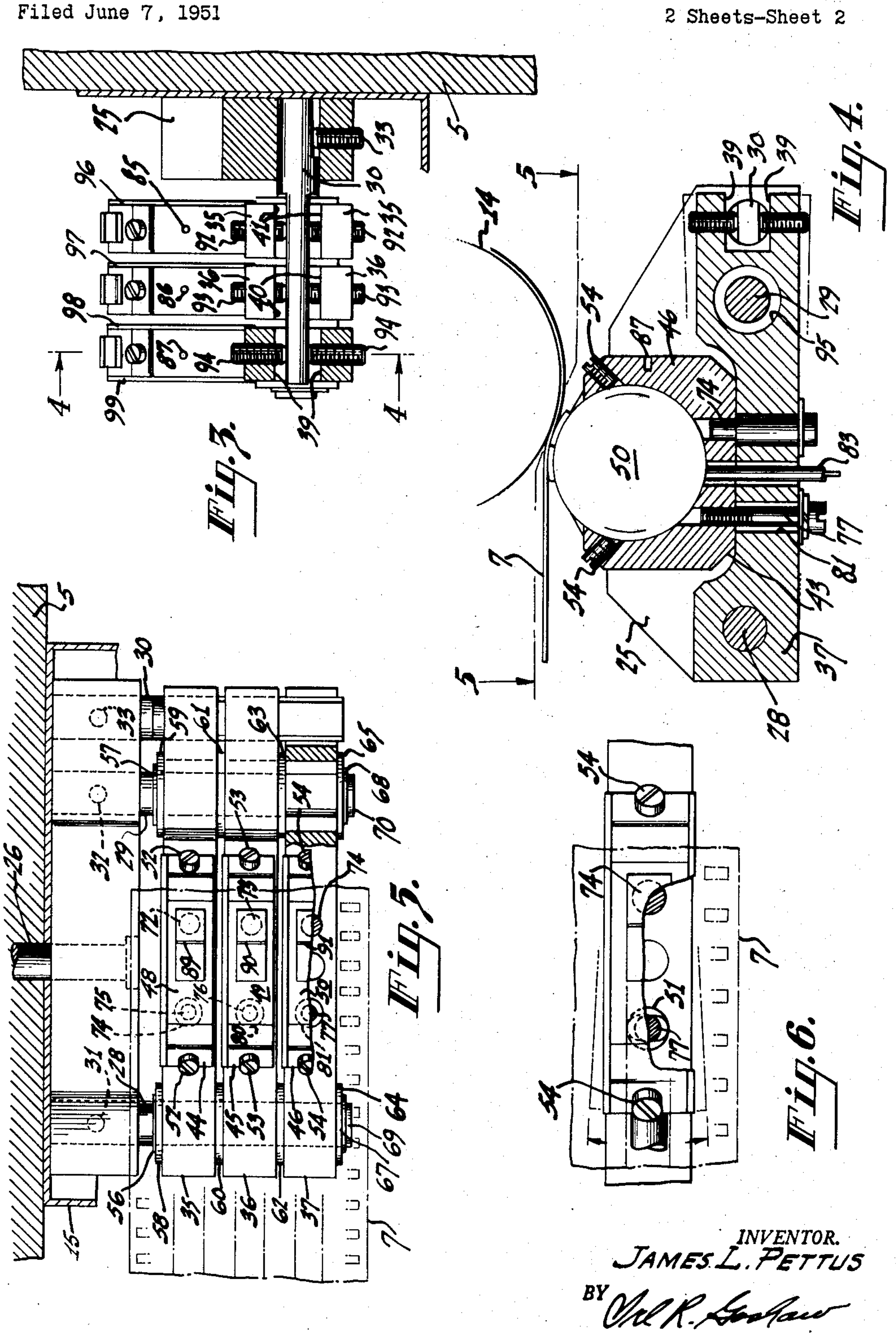
Fig. 3 is a cross-sectional view showing the individual gap alignment adjusting element for each head and taken along the line 3—3 of Fig. 2.
Fig. 4 is a detailed view taken along the line 4—4 of Fig. 3.
Fig. 5 is a plan view of the magnetic heads and their mounting taken along the line 5—5 of Fig. 4.
Fig. 6 is a detailed view showing the azimuth adjustment of one of the individual heads.

Referring to the remaining drawings, the mounting structure is composed of a comparatively heavy trapezoidal-shaped block 25, to which is attached a mounting bolt 26 which passes through the panel 5. The end of the bolt 26 may be threaded and a nut threaded thereon for holding the mounting structure to the panel. Fixedly positioned in the block 25 and extending away from the panel 5 are three rods 28, 29, and 30, the rods being fixedly held in position in block 25 by respective set screws 31, 32, and 33. Pivotally mounted on rod 28 are three saddle members 35, 36, and 37, these members having enlarged holes adjacent one end thereof through which bolt 29 passes. The ends of the members adjacent the bolt 29 are notched, the notches having parallel sides as shown at 39, 40, and 41 (see Fig. 3), and between which the rod 30 passes, this portion of the rod being milled to have two parallel flat sides.

The central portions of the members 35, 36, and 37 are milled out to form saddles, as shown at 43, in which are mounted magnetic head holding yokes 44, 45, and 46. In the yokes are magnetic record, erase, and/or reproduce heads 48, 49, and 50, the heads being held in their respective yokes by respective pairs of set screws 52, 53, and 54. The saddle members 35, 36, and 37 are held on rods 28 and 29 by locking washers 56 and 57, spring washers 58 and 59, spacing washers 60, 61, 62, and 63, and spring washers 64 and 65. U-shaped locking rings 67 and 68 are positioned between the enlarged heads 69 and 70 of the rods 28 and 29 and the spring washers 64 and 65.

The yokes 44, 45, and 46 are attached to the members 35, 36, and 37 by pivot pins 72, 73, and 74, and threaded bolts 75, 76, and 77. The bolts 72, 73, and 74 pass through snug fitting holes in the saddle portion of the members 35, 36, and 37, while the bolts 75, 76, and 77 pass through oversized holes 79, 80, and 81 in the respective members 35, 36, and 37. A third hole in each of these members is for the purpose of accommodating the conductors to the respective heads, one of which is shown at 83.

The first adjustment to be explained will be that known as the azimuth adjustment, which is an adjustment whereby the width of the gap is made perpendicular to the longitudinal axis of the film, or the direction of advancement of the film. This adjustment is obtained by loosening the respective bolts 75, 76, and 77, and then with a turning rod placed in one of the holes 85, 86 or 87, each head is rotated about the axis of the respective pivot pins 72, 73, and 74. The amount of this adjustment is shown by the broken lines in Fig. 6. When the correct position of the gap is located, the bolts 75, 76, and 77 are tightened to their respective saddle members. The next adjustment may be the aligning of all the gaps, such as shown at 89, 90, and 91, so they contact the film in the same position longitudinally thereof. This is accomplished by loosening the pairs of set screws 52, 53, and 54, moving the heads so that the gaps are in line, and then tightening the set screws. If this adjustment is made under a microscope, the gaps may be made to coincide with a cross hair.

To provide the same bearing or pressure of each head on the film, the saddle members 35, 36, and 37 are adjusted about the axis of rod 28, the other ends of the members being movable within the limits of the over-sized holes 95. This is accomplished by backing off either set screw of pairs 92, 93, and 94 against the opposite surfaces of the flattened portion of rod 30. In this manner, the heads may be raised or lowered with respect to the surface of the film 7, the direction of this adjustment being shown by the broken lines in Fig. 4. When these adjustments are accomplished, the respective set screws are tightened. After the three above mentioned adjustments have been made, all three units may be simultaneously rotated about the axis of the bolt 26 so that the gaps are located along the central line of the surface of the film contacted by the pole pieces of the heads. These adjustments thereby permit the proper location and bearing upon the film of each individual unit, the proper alignment of each gap with each other, and the simultaneous contact adjustment of all heads, the adjustments being positive and the elements permanently locked in position when once made. Although one order of making the several adjustments has been described, it is to be understood that they may be made in different orders.

To shield each head from the other and from stray fields, plates of Mumetal are attached to the sides of the heads, as shown at 96, 97, 98, and 99, the attachment of plate 99 being shown in Fig. 2 with screws 100.

I claim:

1. A mounting for a plurality of magnetic heads comprising a panel, a base block, a single bolt for attaching said block to said panel, said block being rotatable about the axis of said bolt, a plurality of elongated members spatially disposed in parallel planes, means for attaching said members to said base block, said means including a pair of rods about the axis of one of which members may be rotated, a yoke for each individual member, each yoke holding a magnetic head, means at the end of said members for adjusting said members in their respective planes with respect to each other, and a pair of rods for attaching said yokes to said members for individually rotating said yokes on said members, all of said members being simultaneously rotatable on said single bolt.

2. A mounting for a plurality of magnetic heads in accordance with claim 1, in which fastening means for said heads in said yokes when adjusted therein are provided.

3. A mounting for a plurality of independent and separate magnetic heads adapted to have the gaps thereof positioned in alignment transversely of a film to be passed thereover, comprising a panel, a base block, a single bolt for mount- said block to said panel, a pair of rods extending from said base block, a plurality of members mounted on said rods and adapted to be adjusted about the axis of one of said rods, said pair of rods holding said members in spatially disposed parallel planes, a third rod passing through openings in the ends of said members, means passing through the ends of said members for contacting said last mentioned rod for rotating said members with respect to each other about the axis of said one rod, a yoke attached to each of said members, bolts passing through said members and attached to said yokes, said yokes being adjustable about the axis of a respective bolt, a magnetic head in each of said yokes, and means for rotating said heads in said yokes.

4. A mounting for a plurality of magnetic heads in accordance with claim 3, in which said last mentioned means includes a pair of screws, one screw being located on each side of the gap in each of said heads.

5. A multiple magnetic head mounting structure comprising a supporting panel, a base block, spaced extensions from said block having their axes in substantially the same plane, a plurality of members spanning said extensions, and spatially disposed in parallel planes, said members being rotatable with respect to one another in their respective planes on the axis of one of said extensions, a yoke mounted on each of said members, means for rotating a magnetic head in each of said yokes, means for rotating said yokes on each of said members, and means attaching said block to said panel for rotating said block and all of said heads simultaneously.

6. A multiple magnetic head mounting structure in accordance with claim 5, in which one of said extensions is positioned in notches at the ends of said members, and adjustable means passing through the ends of said members are provided for rotating said members about the axis of another of said extensions.

7. A multiple magnetic head mounting structure in accordance with claim 5, in which said means for adjusting and holding said yokes to said members includes a pair of bolts passing through each of said members and into a respective yoke, said yoke being pivotable about the axis of one bolt of each of said pairs, said other bolt of each of said pairs holding said yokes in any adjusted positions.

8. A multiple magnetic head mounting structure comprising a mounting panel, a base block, a single bolt for attaching said block to said panel, a plurality of extensions attached to said block, a plurality of cross members attached to said extensions, said members being spatially disposed in parallel planes, a magnetic head holding yoke attached to each of said cross members, means for rotating each of said heads an independent axis on its respective yoke, means for rotating each of said yokes on an axis perpendicular to each of said axes on which said heads are rotatable in said yokes, means intermediate said extensions and said members for adjusting the positions of said yokes and heads with respect to one another in the planes of said cross members, and means for rotating all of said heads simultaneously on the axis of said single bolt, said axis being substantially parallel to the axes of said heads.

JAMES L. PETTUS.

References Cited in the file of this patent

UNITED STATES PATENTS

| Number | Name | Date |
|---|---|---|
| 671,625 | Hawthorne | Apr. 9, 1901 |
| 2,440,841 | De Boer | May 4, 1948 |
| 2,574,707 | Pettus et al. | Nov. 13, 1951 |